United States Patent [19]

Habrich

[11] 4,161,262
[45] Jul. 17, 1979

[54] MULTIPLE DOSING DEVICE
[75] Inventor: Reiner Habrich, Munich, Fed. Rep. of Germany
[73] Assignee: Siemens Aktiengesellschaft, München, Fed. Rep. of Germany
[21] Appl. No.: 833,356
[22] Filed: Sep. 14, 1977
[30] Foreign Application Priority Data
  Sep. 22, 1976 [DE] Fed. Rep. of Germany ....... 2642652
[51] Int. Cl.² .................. G01F 11/28; G01F 11/06
[52] U.S. Cl. .................................. 222/1; 222/309; 222/372; 222/380
[58] Field of Search .............. 222/334, 335, 372, 373, 222/380, 383, 309, 262, 263, 265, 249, 275, 434, 438, 439, 440, 1, 590

[56] References Cited
U.S. PATENT DOCUMENTS

| 2,529,028 | 11/1950 | Landon | 222/373 X |
| 3,079,052 | 2/1963 | Dyck | 222/434 |
| 3,259,281 | 7/1966 | Pikoske | 222/380 X |
| 3,727,804 | 4/1973 | Smith et al. | 222/372 X |

Primary Examiner—David A. Scherbel
Assistant Examiner—Edward M. Wacyra
Attorney, Agent, or Firm—Kenyon & Kenyon

[57] ABSTRACT

A multiple dosing device for the uniform dosing of liquids includes a plurality of dosing elements each including a dosing plunger; end connecting plates; sealing elements, interposed between the faces of adjacent dosing elements and between the faces of a dosing element and a connecting plate; and tie rods holding the dosing plates, end connecting plates and sealing elements together. The dosing plunger movement is controlled in one direction by a fluid pressure and in the opposite direction by the liquid which is under pressure. Diaphragm valves are formed on both faces of the dosing element through cooperation among the dosing element, an interposed sealing element, and a connecting plate.

12 Claims, 3 Drawing Figures

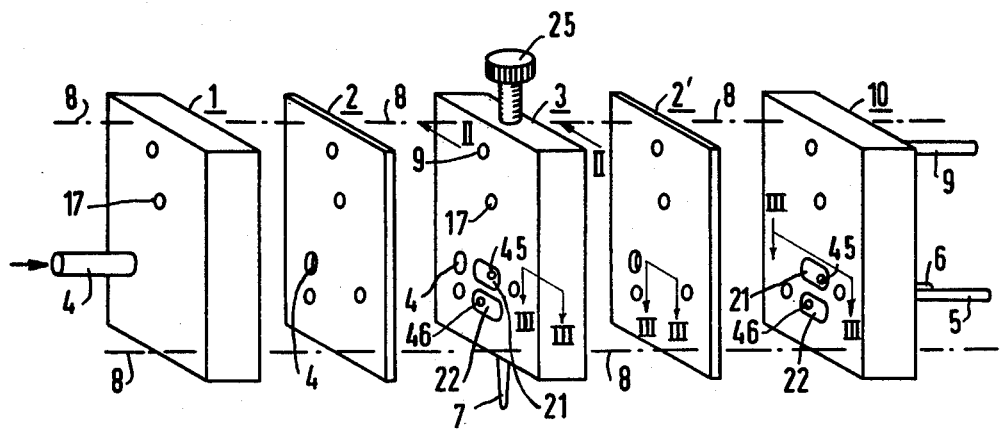
Fig.1
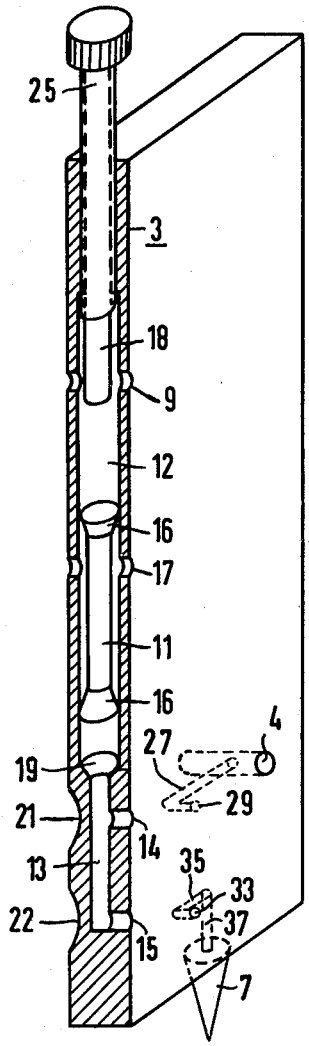
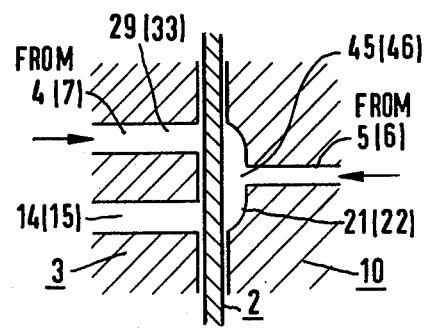
Fig.3

MULTIPLE DOSING DEVICE

BACKGROUND OF THE INVENTION

1. Field of the Invention

This invention relates to a multiple dosing device for liquids and more particularly to such a device for castable reaction resin compounds used in the manufacture of cast and encapsulated mechanical and electrical components such as housings, molds, transformers, capacitors, light emitting diodes, voltages multiplier cascades, and cup type rectifiers.

2. Description of the Prior Art

Multiple dosing devices in which a liquid is apportioned simultaneously into several equal parts are known. When large numbers of componets are made, economy dictates the need for multiple casting.

Some dosing devices employ the suction pump principle whereby the liquid is drawn into the device by suction created by pulling back pistons housed in cylinders immersed in a liquid filled dish ("Physik fuer Rechnische Berufe"— Physics for Technical Vocations, 13th ed., No. 48c). After being filled, the cylinders are moved to a position above the cavities to be filled and the liquid is ejected by means of the piston. Since the cylinders lie in an open dish and are thus exposed to the atmosphere, the liquids can react chemically with gases or moisture in the air. Such reactions degrade the quality of the liquids which, in the case of hexahydrophthalic acid, absorb moisture from the air, or in the case of amines, absorb carbon dioxide. On the other hand, low boiling point liquids evaporate and in this way volatile and possibly injurious components of the liquids may be released into the air. If the cycle frequency is great, complete filling no longer occurs and the multiple dosing becomes nonuniform.

Other known dosing devices accomplish the dosing from a given tank by simultaneous operation of several parallel connected valves (Physik fuer Technische Berufe, No. 51a, b). With this method the material simply flows out. Since the flow conditions vary and are nonreproduceable, the dosing becomes nonuniform.

Dosing can also be accomplished by means of a hose pump with several flexible dosing tubes. However, hoses have different elastic performance and particularly have only moderate restoring force, and as a result, the dosing outputs differ in volume especially in the case of highly viscous liquids. Since hoses fatigue and in time break, the liquids may escape and contaminate the production facility. Furthermore not all materials can be pumped.

Other known multiple dosing devices use mechanically driven synchronous multiple piston pumps having spherical, conical, disk or slide valves. Plunger pumps or diaphragm pumps with spherical, conical, disk or slide valves are also known ("Chemische Verfahrenstechnik"—Chemical Process Technology—by A. G. Kassatkin, 1953, Vol. I, pp. 104–05, 121–22). Such assemblies, however, require a great deal of technical support and in particular the range of the required nozzle spacing is limited.

SUMMARY OF THE INVENTION

According to the present invention, an improved multiple dosing device is obtained which solves the problem of simultaneously dosing several separate quantities with a high degree of uniformity at high cycle rates and with the absence of the disadvantages of presently known devices.

These problems are solved in a device according to the present invention by using a dosing plunger in a dosing element which is controlled in one direction by a pressure fluid, e.g. compressed air or a hydraulic fluid admitted through a plunger control line, and controlled in the opposite direction by the dosed liquid under pressure admitted through an inlet canal. Control of the entrance and exit of the liquid with respect to the dosing chamber is accomplished by diaphragm valves which are formed by cooperating surfaces of either a pair of adjacent dosing elements or a dosing element and a connecting plate with interposed sealing elements between the cooperating surfaces. The dosing device is held together by tie rods.

With the device according to the present invention, the dosing of liquids or reaction resin compounds for the casting of electrical components (and in particular of several partial quantities) is simpler and faster than with known devices. In addition, continued liquid inflow does not generally take place.

Diaphragm valves obtained with a device according to the present invention provide for the control of the liquid to be dosed. When the diaphragm or interposed sealing element is pressed against liquid carrying ducts by pressure from compressed air or hydraulic fluid on the control side of the diaphragm, the valve is closed. If the pressure on the control side of the diaphragm falls below the hydrostatic pressure of the liquid or the reaction resin compound, the valve opens. Faster rates of dosing are possible if the liquid to be dosed is pressurized.

The operation cycle commences when the outlet diaphragm valves are closed by pressure in the outlet control line and the inlet diaphragm valves opened by venting the inlet control line. The pressurized liquid in the inlet canal enters the dosing element and pushes the dosing plunger against an upper stop. Thereupon, the inlet diaphragm valves are closed by pressure in the inlet control line and the outlet diaphragm valves are opened by venting the outlet control line. The dosing plunger is pushed against the lower stop by pressure in a plunger control line and exactly predetermined amounts of the liquid are ejected by the respective plunger travel. The diaphragm valves and dosing plunger can be actuated hydraulically, hydro-pneumatically or pneumatically, the last being preferred.

A program control strictly regulates the sequence of operation of the diaphragm valves and the dosing plunger.

The sealing elements, having the form of plates similar to the form of the dosing element and connecting plates, are constructed from plastic or elastic material.

BRIEF DESCRIPTION OF THE DRAWINGS

FIG. 1 is an exploded layout of a device for the multiple dosing of liquids compounds.

FIG. 2 is an elevational cross section of a dosing element.

FIG. 3 is a top cross section of a diaphragm valve.

DETAILED DESCRIPTION OF THE INVENTION

A typical arrangement of a multiple dosing device is illustrated in FIG. 1. This device is used for the simultaneous, multiple dosing of liquids or castable reaction resin compounds in the manufacture of electrical and mechanical components. Normally the liquids or castable compounds have a viscosity of about 1000 cp (centipoise). For sake of simplicity only a single dosing element 3 is shown being disposed between end plates 1 and 10 (with interposed sealing elements 2 and 2'). In practice, a plurality of dosing elements 3 will be contained between end plates 1 and 10.

The dosing element 3 comprises a rectangular block into which are formed a plurality of passages to be described in detail below. In the center of dosing element 3 there is formed a bore 12 which can be seen in more detail on FIG. 2 which is a view taken along the line II—II of FIG. 1. The upper portion of the bore 12 is threaded and a screw 25 is inserted therein terminating in an end stop portion 18 which forms an upper stop for a dosing plunger 11 disposed within the cylindrical bore. The plunger is capable of moving between the upper stop 18 and a lower stop 19. A narrower bore section 13 is formed below the stop 19 and communicates with an inlet hole 14 and outlet hole 15. The dosing plunger 11 contains on each end a plunger sleeve 16 preferably of a flexible material to aid in sealing. Admission of a fluid pressure medium through an opening 9 near the upper stop 18 will result in the dosing plunger being pushed downward toward the stop 19. Similarily admission of a pressure medium through inlet hole 14, assuming the outlet hole 15 is closed, will result in moving the dosing plunger up against the stop 18.

In a manner to be more fully described below, operation of the plunger commences by first relieving any pressure at the inlet 9 by venting that inlet to the air. The opening 15 is closed off by a diaphragm valve to be explained in conjunction with FIG. 3. The material to be dosed is supplied under pressure to the inlet 14 whereupon it forces the dosing plunger 11 upward and fills the cylindrical chamber with the amount of material which it is desired to dispense. Then the lower portion of the cylindrical bore 12 below the plunger 11, along with the bore 13, is filled with the liquid to be dosed. The inlet 14 is closed by a diaphragm valve and outlet 15 opened by another diaphragm valve. The pressure fluid is then admitted through the inlet 9 and acts on the dosing plunger 11 to push it downward forcing the material to be dosed out through the outlet 15. The outlet 15 is coupled through the diaphragm valve to a discharge nozzle 7 which will be disposed directly above the opening to be filled with the liquid being dosed.

The dosing element 3 as can be seen from FIG. 1 contains, in addition to the cylindrical bore and the various inlets and outlets just described a passage 4 through which the material to be dosed is supplied. It also contains two control passages 5 and 6 for controlling the diaphragm valves for the inlet and outlet holes 14 and 15. Also, formed in the one side of the dosing element 3, shown both on FIGS. 1 and 2 are depressions 21 and 22 which are used in forming the diaphragm valves for an adjacent dosing element.

As indicated above a plurality of dosing elements 3 will be provided. However, only one is shown in the figure. The dosing elements are interposed between end plates 1 and 10. End plate 1 is a liquid connecting plate and end plate 10 is a control connection. The liquid inlet 4 mentioned above is extended beyond the inlet connection plate 1 and connected to a source of dosing liquid under pressure. The control connection plate 10 similarily contains extensions of the passages 9 and control passages 5 and 6 which are coupled through an appropriate control system to a source of fluid pressure preferably compressed air. Between the dosing element 3 and each of the plates 1 and 10 is a sealing element 2 or 2'. The sealing elements are formed with the same holes as are dosing elements 3, i.e., they have the holes for the control channels 9,5 and 6 and a hole 4 for the dosing liquid. In addition all elements have a hole 17 which, as can be seen on FIG. 2 communicates with the central area of the dosing plunger. This permits any pressure fluid which gets past the seals 16 being vented to the outside and prevents a buildup of pressure or fluid therein. It is evident, that each of the control lines 9, 5 and 6 will be in communication with each dosing element which is interposed between the two end plates 1 and 10 and thus all dosing element will be controlled together. Similarly the dosing liquid admitted through the channel 4 will be available at each dosing element. Note that the control channels are not formed in the end plate 1 but that this plate terminates these channels. Similarly the end plate 10 terminates the liquid supply channel 4. The end plate 10 contains depressions 21 and 22 which are identical to the depressions 21 and 22 in the dosing element 3. These depressions, in cooperation with the interposed sealing element 2' between the plate 10 and the dosing element 3, form the diaphragm valves for the dosing element 3. In the embodiment shown the depressions 21 and 22 on the dosing element itself serve no purpose since the next plate to the left is the end plate 1. However, if another dosing element were interposed they would then cooperate with the adjacent sealing element 2 to form the diaphragm valves for that dosing element.

As shown by FIG. 2, the liquid inlet 4 is connected through a channel 27, formed within the dosing element 3 to outlet 29 opposite the inlet 14. Similarly a channel 35 having outlet 33 terminating opposite the outlet 15 is formed within the dosing element 3 and connects to a bore 37 in communication with the dispensing nozzle 7.

The control lines 5 and 6 are coupled through blind channels to the depressions 21 and 22 terminating at that point in openings 45 and 46 respectively. This is shown in more detail on FIG. 3 which is a cross sectional plan view of the diaphragm valve. With the plate 10 up against the dispensing device 3 and the sealing member interposed there between, pressure admitted to the control lines 5 or 6 will act to press the diaphragm 2' against the dispensing device 3 to close off the channel 4 from hole 14 or to close off the outlet 7 from hole 15. When the pressure is released the existing pressure either on the line 4 or developed within the cylindrical bore and present at the outlet hole 15 will deform the sealing member 2 into the depression 21 or 22 and permit passage of fluid either into the cylindrical chamber or out from the cylindrical chamber to the dispensing nozzle 7.

A complete operation cycle which is controlled by a programmed control system beyond the scope of this application involves the entrance of liquid through the inlet canal 4, the venting of inlet control line 5, and the plunger control line 9, and the pressurizing of the outlet control line 6. The liquid passes through the entrance port 14 but remains in the dosing chamber 13 since the exit diaphragm valve 20 is closed. The liquid pushes the dosing plunger up against stop 18. The feed in cycle completed, exit diaphragm valve 20 is opened by venting of outlet control line 6. The inlet diaphragm valve is closed by pressurizing the inlet control line 5. The plunger control line 9 is pressurized thus forcing the dosing plunger against lower stop 19 whereby a predetermined amount of liquid is pushed out outlet 15 and through the discharge nozzle 7. Thereupon the operation cycle begins anew.

Construction of the different plates and interposing sealing elements is similar as to size and cutouts so as to accomodate a number of dosing elements comprising the multiple dosing device. Thus the back face of dosing element 3 also has depressions 21 and 22 as does the back face of the control connection plate 10.

The dosing plunger 11 consists of a cylindrical body having at each end an annular groove into which an O-ring and preferably a plunger sleeve 16 of elastic material is inserted or vulcanized. The plunger sleeve 16 has the form of a conical cup, the edge of which is pointing as a sealing lip against the medium to be sealed.

The dimensions of the area of the sealing elements 2 are similar to those of the dosing elements 3. Cutouts on the sealing elements occur at the same locations as on the dosing elements. The sealing elements are substantially thinner than the dosing elements.

Both the sleeves and the sealing elements are constructed from plastic or elastic material. Particularly suitable are elastomers such as fluorosilicone rubber or ethylenepropylene rubber.

In addition, holes for the temperature control liquid normally used to maintain the resin compounds in a fluid state and tie rods are provided perpendicular to the plane of the plates. Like the plunger control line 9, the flushing hole 17 passes through the cylinder bore 12 and is centered as far as possible. Thereby, the dosing plunger 11 can readily be flushed with lubricating liquid and control air removed, should the plunger sleeve 16 develop a leak. The upper stop 18 can be raised or lowered by the adjustable screw 25. It is advantageous if the cylinder bore is formed by a section of tube.

A device according to the present invention is advantageously used for the dosing of resin compounds which provide for casting electrical components such as in the manufacture of encapsulated semiconductors, transformers, cascades, and capacitors.

I claim:

1. An improved multiple dosing device for dosing liquids comprising:
    (a) a liquid connecting plate having an inlet to which the liquid to be dosed can be supplied, said inlet being extended through said plate as a bore perpendicular to said plate;
    (b) a control connecting plate having inlet connections for a pressure fluid including a first valve control inlet, a second valve control inlet and a dosing control inlet, each of said inlets being extended through said plate as bores perpendicular to said plate;
    (c) at least one dosing element plate containing first, second, third and fourth perpendicular bores aligned respectively with the liquid inlet bore of said liquid connecting plate, the first valve control bore, the second valve control bore and the dosing control bore of said control connecting plate, said dosing element further including:
        (1) a cylindrical bore through the center thereof essentially perpendicular to said first, second, third and fourth bores;
        (2) a dosing plunger disposed for sliding motion within said cylindrical bore;
        (3) said fourth bore opening into said cylindrical bore above said dosing plunger;
        (4) an inlet hole below said plunger;
        (5) an outlet hole below said plunger; and
        (6) dispensing means;
    (d) a plurality of sealing elements, each having holes therein corresponding to said first, second, third and fourth bores, one of said sealing elements being interposed between each two adjacent plates, said at least one dosing element being disposed between said liquid connection plate and control connection plate;
    (e) first and second diaphragm valves formed by cooperating portions of said control connection plate and said dosing element plate with said sealing elements at said inlet and outlet holes to said cylindrical bore;
    (f) first means coupling said first bore to said first diaphragm valve;
    (g) second means coupling said dispensing means to said second diaphragm valve;
    (h) third means coupling said second bore to control said first diaphragm valve;
    (i) fourth means coupling said third bore to control said second diaphragm valve;
    (j) means for holding said liquid connecting plate, said at least one dosing element, said control connecting plate and said plurality of interposed sealing elements together with all of said bores in alignment.

2. The dosing device of claim 1 wherein said means for holding comprise tie rods inserted through holes formed in said plates and said sealing elements.

3. The dosing device according to claim 1 wherein said dosing plunger comprises a cylindrical member having an annular groove at each end and further including means of an elastic material inserted into said annular groove for sealing.

4. The dosing device according to claim 3 wherein said sealing means comprise cup shaped plunger sleeves of elastic material.

5. The dosing device according to claim 4 wherein said elastic material is a vulcanized material.

6. The dosing device according to claim 3 wherein said sealing elements comprise an elastic material.

7. The dosing device according to claim 6 wherein said sealing elements and said sealing means consist of ethylenepropylene rubber.

8. The dosing device according to claim 6 wherein said sealing elements and sealing means consist of fluorosilicone rubber.

9. The dosing device according to claim 1 wherein said diaphragm valves comprise depressions formed in one side of each of said dosing elements and said control connecting plate disposed opposite said inlet and outlet holes respectively, the first and second means coupling said inlet bore and dispensing means terminating adjacent said inlet and outlet holes and opposite said depressions; and said third and fourth means coupling to said depressions on the side of said sealing elements opposite said holes, whereby the application of pressure will close off said inlet and outlet holes and the release of pressure will permit stretching of said sealing elements and passage of said dosed liquid.

10. A method of dosing liquid such as reaction resin compounds for casting comprising the steps of:
    (a) interposing plate shaped dosing elements, each containing a dosing plunger, with a dosing liquid inlet, dosing liquid outlet and a dosing control inlet between a liquid connecting plate and control connecting plate with a sealing element interposed between each two adjacent plates;

(b) forming diaphragm valves from cooperating surfaces of said plates and said sealing elements, a first valve being formed for each dosing element at the dosing liquid inlet and a second valve being formed at the dosing liquid outlet;

(c) feeding the liquid to be dosed under pressure from said liquid connecting plate to the first diaphragm valve associated with each dosing element; and (d) controlling said diaphragm valves such that:
 (1) the first diaphragm valves are opened to permit the dosing liquid, under pressure, to move the dosing plungers in one direction and fill cylinders;
 (2) said first diaphragm valves are closed and said second diaphragm valves opened; and
 (3) a fluid pressure medium is applied to the dosing control inlet to operate said dosing plungers in the opposite direction to simultaneously dispense dosing liquid from all of said dosing elements.

11. The method according to claim 10 wherein said step of supplying said liquid to be dosed comprises supplying said liquid to be dosed from said liquid connecting plate through a series of bores extending through each of said plates and interposed sealing elements to said first diaphragm valves and further including supplying the control medium to said dosing plungers and to said diaphragm valves in similar fashion by common bores extending through all of said elements, said bores being in communication respectively with said diaphragm valves and dosing plunger.

12. The method according to claim 11 wherein the control medium acting upon said dosing plunger and upon said diaphragm valves comprises compressed air.

* * * * *